June 1, 1943. J. M. LUKER 2,320,370
HINGE DEVICE
Filed June 4, 1940 2 Sheets-Sheet 1
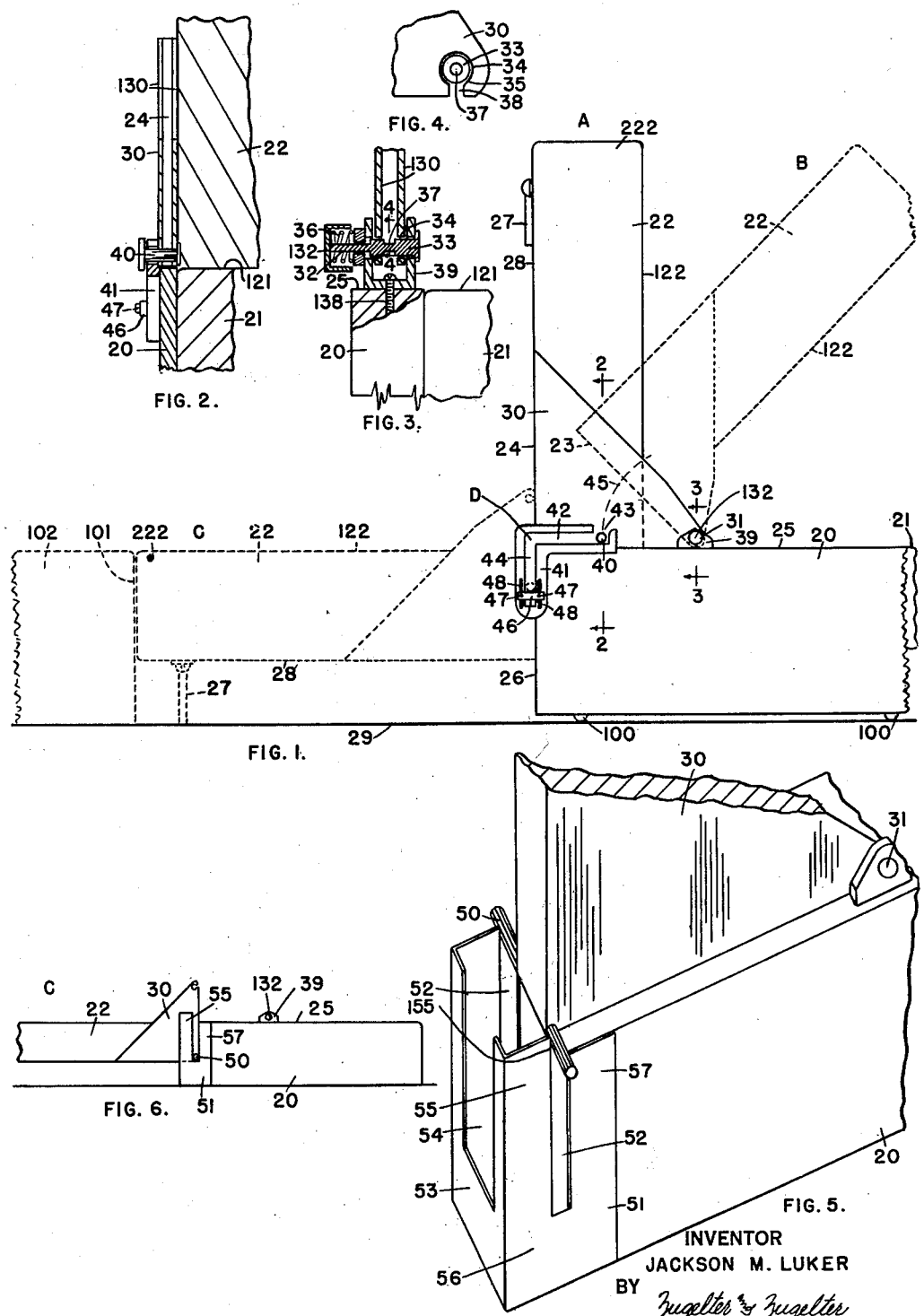
INVENTOR
JACKSON M. LUKER
BY
Zugelter & Zugelter
ATTORNEYS June 1, 1943.　　J. M. LUKER　　2,320,370
HINGE DEVICE
Filed June 4, 1940　　2 Sheets-Sheet 2

INVENTOR
JACKSON M. LUKER
BY
*Zugelter and Zugelter*
ATTORNEYS

Patented June 1, 1943

2,320,370

UNITED STATES PATENT OFFICE 2,320,370

HINGE DEVICE

Jackson M. Luker, Urbana, Ill.

Application June 4, 1940, Serial No. 338,749

5 Claims. (Cl. 155—7)

This invention relates to hinge devices, and more particularly to hinge devices of the general class adapted for use with auto seats, studio couches, load leveling devices and the like, wherein it is desirable to selectively maintain certain relatively movable elements in any one of several positions.

An object of the present invention is to provide a hinge device for auto seats, studio couches and the like, wherein the rear cushions may be disposed at substantial right angles to, or in the plane of the seat cushions.

Another object of the present invention is to provide a sturdy, yet inexpensive hinge device which may be simply and easily attached to the standard front seat hinge mechanism of an automobile whereby the rear cushion may be lowered rearwardly of and into the plane of its respective seat cushion for providing a bed.

Another object of the present invention is to provide a hinge device having the hereinabove described characteristics which will permit the adjacent edges of a rearwardly lowered rear cushion and its seat cushion to be in abutment whereby the resultant bed is coplanar and continuous.

A further object of the invention is to provide a hinge device which is particularly adapted for studio couch use in providing a frame structure for supporting the rear cushions and their respective springs in an upright position relative to the seat cushions, and which will permit the frame structure to be swung rearwardly of and into the plane of the seat cushions for providing a level double bed.

Still a further object of the present invention is to provide a novel hinge device which is structurally simple, sturdy and adapted to be manufactured in great quantities as well as being foolproof and dependable in operation.

These and other objects are attained by the means described herein and disclosed in the accompanying drawings, in which:

Fig. 1 is a side elevational view of the front and back seat assemblies of an automobile showing the front seat in its normal upright position, and showing in dotted lines, the rear cushion of the front seat in its forwardly and rearwardly lowered positions.

Fig. 2 is a vertical section taken on line 2—2 of Fig. 1.

Fig. 3 is a vertical section taken on line 3—3 of Fig. 1.

Fig. 4 is a vertical section taken on line 4—4 of Fig. 3.

Fig. 5 is a perspective view of a modified form of hinge forming a detail of the present invention.

Fig. 6 is a side elevational view of the hinge of Fig. 5 associated with the seat structure of Fig. 1.

Figure 7:
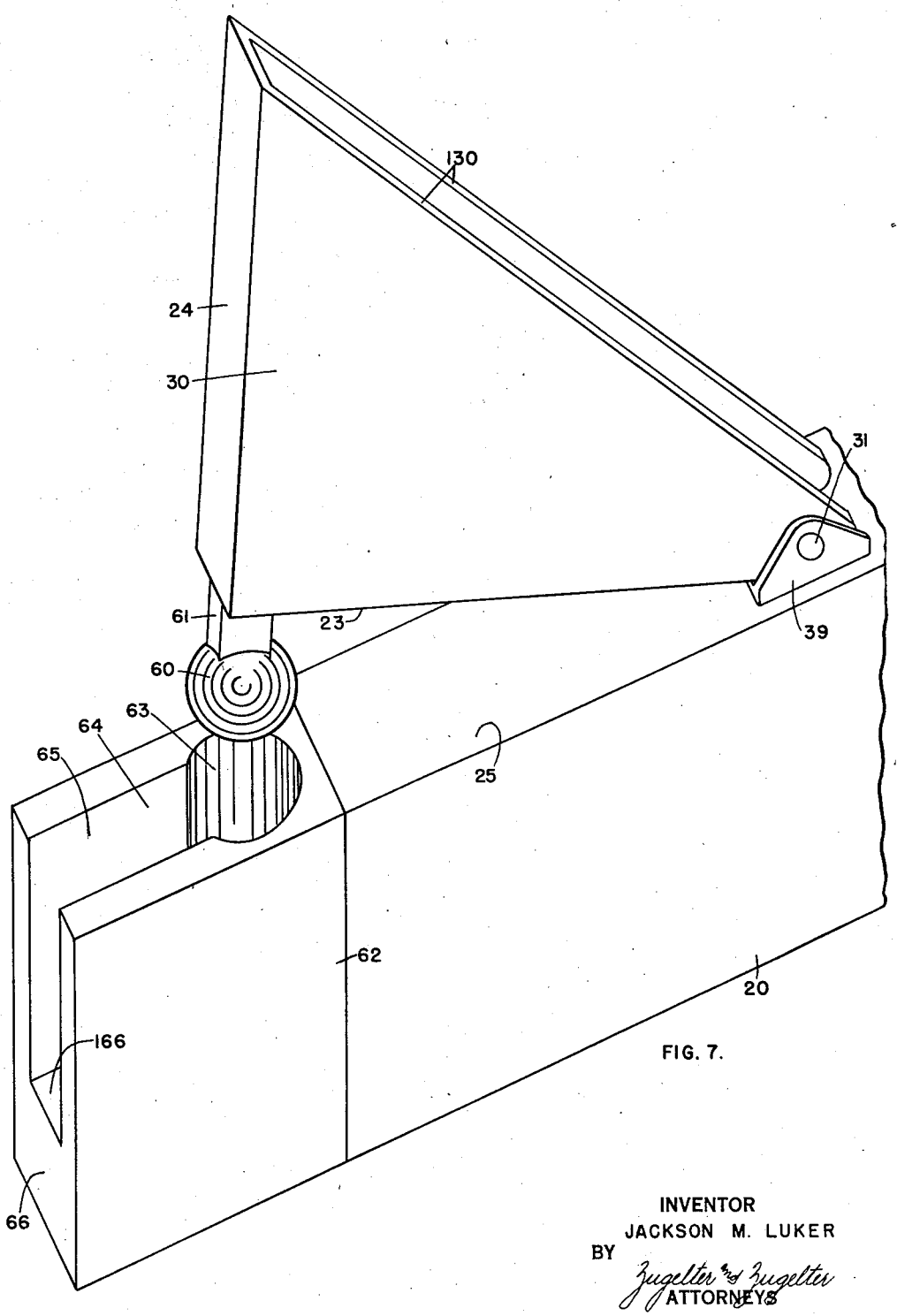
Fig. 7 is a perspective view of another modified form of hinge structure comprising a detail of the present invention.

With reference to Fig. 1, the numeral 20 indicates generally the side board or frame to which auto seat cushion 21 is secured. The rear cushion, denoted generally by the numeral 22, is normally disposed in an upright position, denoted by the letter A, whereby to provide an upright back rest for seat cushion 21.

Rear cushion 22 is adapted to be lowered forwardly over seat 21, as indicated by the broken lines to position B, or it may be lowered rearwardly relative to seat 21 to position C, as indicated by the broken lines. It is highly desirable that the rear cushion be operatively connected, at all times, to seat cushion 22 or to other suitable support means, in order to preclude accidental or unintentional disassociation of the rear cushion from its seat cushion while being moved between positions A, B and C.

In the preferred embodiment of the invention, a linkage member 30 is secured to and carried by opposite ends of rear cushion 22. Each linkage member may include a bottom face 23 and a rear face 24, disposed at substantial right angles thereto. The forward end of each linkage member is pivotally connected, as at 31, to end frame 20 whereby the rear cushion may be swung forwardly, that is, in a clockwise direction, over seat cushion 21, from position A to B. Movement of cushion 22 about pivotal connection 31 rearwardly of seat cushion 21 is precluded by reason of contact between bottom face 23 of linkage member 30 with upper face 25 of frame 20.

For the purpose of the present invention, the pivotal connection at 31 is preferably detachable or releasable in order to permit the connection with the linkage member to be severed thereby disconnecting it from the side frame 20.

With reference to Figs. 3 and 4, one illustrative type of releasable pivotal connection means is disclosed which has been found quite satisfactory, however, it should be understood that other connector means can be substituted for the one illustrated, if desired. The pivotal connection at 31 comprises a laterally shiftable lock pin 32, the shank 37 of which is provided with a pair of spaced shoulders 33 which are engageable by the rounded portion 34 of a key hole slot 35 provided in the lower forward face of linkage member 30. With reference to Fig. 3, it is noted that the linkage member illustrated comprises a pair of spaced parallel metallic sheets or members 130 which are connected along rear face 24. During those periods of time when the rounded portion 34 of the keyhole slot 35 engages shoulders 33, linkage member 30 is pivotally connected to end or side frame 20. In order to release this pivotal connection, pin 32 is adapted to be shifted to the right, against the counter force of spring 36, whereby to dispose reduced shank 37 in vertical alignment with the narrow constricted passageway 38 of keyhole slot 35.

If desired, pin 32 may be supported by a U-shaped bearing bracket 39 suitably secured to the upper face 25 of side frame 20 by means of bolts or screws 138. In order to facilitate actuation of lock pin 32, a head or knob 132 may be provided on its free end, as shown.

In order to lower the rear cushion into horizontal position C, the pivotal connection at 31 is broken, thereby permitting linkage member 30 and its associated rear cushion to be shifted relative to side frame 20. With reference to Figs. 1 and 2, it is seen that linkage member 30 is provided with a guide pin 40 which is permanently and rigidly secured thereto. Pin 40 is adapted to engage bracket 41 which may be carried by and secured to side frame 20 by suitable means not illustrated. Bracket 41 comprises a horizontal channelway 42 open at its forward upper end at 43, and a communicating closed end-vertical channelway 44.

In the preferred embodiment of the invention, the width of channels 42 and 44 is the same. Likewise, the spacing of the longitudinal axis of the vertical channelway 44 from the rear face 26 of side frame 20 is the same as the spacing of the longitudinal axis of the horizontal channelway 42 from the upper face 25 of said side frame. Such construction permits the lower face of rear cushion 22, when in position C, to abut the rear face of seat cushion 21 with the same degree of snugness as the lower face abuts the upper face of the seat cushion when disposed in upstanding position A.

During those periods of time when linkage member 30 is in engagement with pivotal connection 31, guide pin 40 will be moved along arc 45 (Fig. 1) as the rear cushion is swung forwardly relative to seat 21 between position A and B. After the pivotal connection at 31 has been broken, rear cushion 22 and linkage member 30 may be bodily shifted, while in an upstanding position, rearwardly relative to seat cushion 21 and side frame 20 until pin 40 is disposed in area D, defined by the intersection of channelways 42 and 44. The rear cushion and linkage member are then adapted to be swung rearwardly, that is, in a counter-clockwise direction, about pin 40 which acts as an axis, until bottom face 23 of the rear cushion is parallel with rear face 26 of side frame 20. Cushion 22 and linkage member 30 may then be vertically lowered into position C which is in the plane of seat cushion 21.

It should be observed that the level or horizontal plane of the forward face 122 of rear cushion 22, when lowered to position C, is determined and fixed by the distance to which guide pin 40 enters vertical channelway 44. The degree to which pin 40 enters channelway 44 may be fixed or it may be vertically adjustable by means of a lock plate 46 secured to bracket 41 by means of bolts 47 which cooperate with slots 48, as shown. By reason of such construction, it is but a simple matter to align forward face 122 of the rear cushion with the upper face 121 of the seat cushion whereby to provide a flat, level bed surface.

It should be again observed that the bottom face 23 of the rear cushion 22 will contact and be in coplanar abutment with the rear vertical face 26 of the seat cushion by the same amount by which it contacts and abuts the upper face 121 of the seat cushion when it, the rear cushion, is disposed in position A. In this manner a snug fit is obtained between the adjacent faces of the bed forming members.

In order to support the top portion 222 of rear cushion when lowered into position C, a suitable leg member 27, pivotally secured to and carried by the upper rear face 28 of said cushion may be provided. This leg may engage floor 29, as shown, to support cushion 22 in the horizontal position C as shown in Fig. 1.

It should be observed that the entire seat assembly may be bodily shifted forwardly or rearwardly upon rollers 100 or upon suitable guideways, not illustrated, as is customary in the automobile industry. Such lateral adjustment permits the rear cushion 22, when in position C to be moved into abutment with the front face 101 of the rear-automobile-seat cushion 102, shown in broken lines. In this manner it is possible to provide a continuous, level bed surface consisting of the seat cushions 21 and 102 of the front and rear seats, and the rear cushion 22 of the front seat, as shown.

In order to return rear cushion 22 and linkage member 30 to position A, it is necessary only to reverse the lowering procedure, hereinabove set forth.

With reference to Fig. 5, a modified type of hinge device is illustrated. This device differs from the hinge of Fig. 1 in the following respects, viz: guide pin 50 is disposed at the rear corner of linkage member 30 instead of at the intermediate location of pin 40 of Fig. 1. In all other respects the linkage members of Figs. 1 and 5 are the same.

The primary difference between the bracket member 51 of Fig. 5, and bracket 41 of Fig. 1 is that bracket 51 of Fig. 5 has only a vertical channelway 52 with which guide pin 50 is aligned during those periods of time when the rear cushion 22 is in position A. The rear wall 53 of bracket 51 is provided with a vertical open-topped slot 54, the lateral width of which is of a dimension sufficient to permit the rear portion of linkage member 30 to be freely received therebetween when in lowered position C.

In the preferred embodiment of the invention, the rear portion 55 of bracket side wall 56 is higher than the forward portion 57 in order to provide an elevated edge or stop 155, with which the lock pin will cooperate to prevent accidental or unintentional rearward displacement of the linkage member and its associated rear cushion relative to side frame 20 and its associated seat cushion 21.

A second modified form of hinge device is illustrated in Fig. 7, wherein the guide pin comprises a spherical head or ball 60 carried by and secured to the lower end of fixed link 61. The upper end of link 61 is suitably anchored to the lower face 23 of linkage member 30 whereby ball 60 is spaced from said lower face as shown, Ball 60 is adapted to cooperate with the circular portion 63 of a vertical keyhole-shaped channelway 64 of bracket 62. The circular portion 63 is in communication with the rear face 66 of its bracket by means of the narrow throat portion 65, as shown.

During those periods of time when the rear cushion is disposed in an upstanding position A (Fig. 1), ball 60 engages the upper portion of the circular part 63 of channelway 64. When the pivotal connection at 31 has been released, linkage member 30 may be swung rearwardly, counter clockwise, about ball 60 as a pivot. The rear face 24 of bracket 30 is adapted to be lowered into throat 65 to abut upon bottom face 66 of channelway 64. By reason of the ball-and-socket relationship between ball 60 and the circular portion of the keyhole shaped channelway 64, relative side motion between the rear cushion and the seat cushion is effectively precluded during those periods of time when the rear cushion is being moved between positions A and C, Fig. 1.

It should be observed that by reason of the constructions hereinabove described, the rear cushion may be swung forwardly or rearwardly of its normal upright position A without the use of expensive or complicated hinge mechanisms. It should likewise be observed that the linkage members 30, rear and seat cushions 22 and 21 and side frame 20 are standard automotive equipment on practically every modern U. S. automobile. To equip the seat structures of such automobiles with the present hinge device, it is only necessary to attach a guide pin such as 40, 50 or 60, to the standard linkage member; secure a socket member 41, 51 or 62, to the standard side frame 20; and substitute a break-pivotal joint as at 31 for the standard fixed pivot usually provided. By such procedure it is possible to quickly and easily, also inexpensively equip an automobile with a front seat, the rear cushion of which can be quickly and easily lowered into a plane, comfortable bed.

It should be understood that in almost every instance, the opposite side or ends of a back rest member or cushion are each provided with duplicate, complementary hinge structures. It should be further observed that the present invention is not concerned with nor directed to the manner in which the various rear and/or seat cushions are secured to their respective supporting structures. The term rear cushion, as used herein, is used in the sense of meaning the back or back rest cushion or member which when disposed at substantially right angles to a horizontal seat cushion or member, provides a vertical back support for persons sitting on the seat cushion.

From the foregoing, it is apparent that I have provided a compact structurally simple hinge device, which may be sold as standard equipment, or which may be later attached to seat structures such as automobile seats, studio couches and the like. By reason of such devices, it is, for the first time, possible and practicable to make a comfortable level bed surface out of the rear and seat cushions of an automobile, studio couch or other seat structure.

It should be understood that various changes and modifications in the structural details of the device may be made, within the scope of the appended claims, without departing from the spirit of the invention.

What is claimed is:

1. A hinge device for seat structures, which comprise a substantially horizontal seat member and a back rest member disposed normally at substantially right angles thereto, said device consisting of a linkage member having a bottom and a rear wall, a pair of said linkage members being carried by and permanently secured one each to opposite sides of said back rest member, a pair of side frames permanently fixed one each to opposite sides of said seat member, each side frame including a top and a rear face, pivotal means carried by said side frames for releasably engaging one each a linkage member, said pivotal means providing a common axis about which said back rest member may be swung forwardly over said seat member, a pair of brackets fixed one relative to the rear of each side frame, each bracket including a vertical channelway, a channelway engaging member secured to and carried by each linkage member, the back rest member and its associated linkage members adapted to be swung rearwardly of said seat member and its associated side frames about said channelway engaging members after said linkage members have been disengaged from their respective pivotal means, said back rest member then adapted to be swung rearwardly until the bottom walls of said linkage members are disposed at substantially right angles to the top faces of their corresponding side frames, after which said channelway engaging members are adapted to be lowered into their respective channelways for disposing the bottom walls of said linkage members in substantially parallel, abutting adjacency with the rear faces of their corresponding side frames and wherein said back rest member is lowered into the horizontal plane of said seat member for providing a uniplanar, continuous supporting surface having a width equal to the sum of the widths of said seat and back rest members respectively.

2. A hinge device for seat structures, and the like, which comprises a normally horizontal seat member and a back rest member normally disposed at substantially right angles thereto, said hinge device comprising a linkage member including a bottom face having a forward and a rear end, said rear end terminating in a rear face disposed at substantially right angles to said bottom face, said linkage member being permanently secured to and carried by said back rest member, pivotal means fixed relative to said seat member and adapted to releasably engage the forward end of said linkage member for providing an axis about which said back rest may be swung forwardly over said seat member, the bottom face of said linkage member being adapted to engage said seat member when the back rest is disposed at substantially right angles therewith, said pivotal means precluding movement of said back rest rearwardly of the seat member, a channeled bracket disposed to the rear of said seat member, means carried by and secured to said linkage member intermediate its forward and rear ends, said means adapted to slidably engage said channeled bracket only during those periods of time when said pivotal means are disengaged from said linkage member, said last mentioned means adapted to provide an axis about which said back rest member may be swung rearwardly of and lowered relative to said seat member for disposing said back rest in the horizontal plane of said seat member.

3. A hinge for seat structures, including a seat member disposed between and supported by a pair of spaced side frames and a back rest member normally disposed in an upstanding position relative to said seat member, said hinge including a linkage member comprising a front and a rear end, a pair of said linkage members being fixed one each to the opposite sides of said back rest member, pivotal means carried by each side frame for releasably engaging the forward end of said linkage members, a bracket secured to and carried by each side frame, a keyhole shaped channelway provided in said bracket, a head secured to and carried by the rear end of each linkage member, said head adapted to engage the circular portion of said keyhole shaped channelway when said back rest member is disposed in its upstanding position and while said linkage members are engaged by said pivotal means, each of said heads comprising an axis about which its associated linkage member may be swung after being first disengaged from said pivotal means, for disposing said linkage members one each in the throat of the keyhole portion of a bracket and whereby said back rest member is leveled into the plane of said seat member.

4. A hinge device for seat structures, and the like, which include a substantially horizontal seat member and an upstanding back rest member, said hinge device comprising a linkage member secured to and carried by said back rest member, said member having forward and rear ends, means fixed relative to said seat adapted to releasably engage the forward end of said member for providing a pivotal connection about which said back rest may be swung forwardly over said seat, said pivotal connection precluding movement of said back rest rearwardly of said seat, means including a channelway having a substantially vertical leg fixed relative to said seat, means on the rear portion of said linkage member adapted to engage said channelway when said back rest is in its normal upstanding position for providing a pivotal connection about which said back rest member may be moved relative to said seat member upon release of said first mentioned means to a position alongside of and substantially level with said seat.

5. A hinge device for seat structures and the like, which includes a seat member and an upstanding back rest member adapted for movement to a position at an acute angle overhanging the seat, and to a position alongside of and level with said seat, said device comprising a linkage member which includes a pair of spaced entirely independent pivot forming means, said back rest member adapted to be moved about one of said pivot forming means to a position at an acute angle overhanging said seat, and about the second pivot forming means to a position alongside of and substantially level with said seat, each of said pivotal means being disposed relative to one another whereby to be simultaneously engaged by said back rest member when in an upstanding position relative to said seat, and latching means associated with said first mentioned pivot forming means for precluding accidental or unintentional movement of said back rest member about said second pivot forming means.

JACKSON M. LUKER.